United States Patent
Matsuda (10) Patent No.: US 10,544,839 B2
(45) Date of Patent: Jan. 28, 2020

(54) LOCK-UP DEVICE FOR TORQUE CONVERTER

(71) Applicant: EXEDY Corporation, Neyagawa-shi, Osaka (JP)

(72) Inventor: Satoru Matsuda, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 469 days.

(21) Appl. No.: 15/434,330

(22) Filed: Feb. 16, 2017

(65) Prior Publication Data

US 2017/0268582 A1    Sep. 21, 2017

(30) Foreign Application Priority Data

Mar. 18, 2016    (JP) .................................. 2016-055069

(51) Int. Cl.
| | |
|---|---|
| *F16D 25/06* | (2006.01) |
| *F16H 45/02* | (2006.01) |
| *F16D 25/0638* | (2006.01) |

(52) U.S. Cl.
CPC ......... *F16D 25/0638* (2013.01); *F16H 45/02* (2013.01); *F16H 2045/0221* (2013.01); *F16H 2045/0284* (2013.01)

(58) Field of Classification Search
None
See application file for complete search history.

(56) References Cited

U.S. PATENT DOCUMENTS

| | | | | |
|---|---|---|---|---|
| 5,125,486 A | * | 6/1992 | Murata | F16H 45/02 192/208 |
| 5,263,320 A | * | 11/1993 | Hall, III | F16H 61/50 60/347 |
| 5,421,439 A | * | 6/1995 | Hayasaki | F16D 25/0638 192/106 F |
| 5,669,474 A | * | 9/1997 | Dehrmann | F16H 45/02 192/107 R |
| 6,347,695 B1 | * | 2/2002 | Kuhn | F16D 13/72 192/106 F |
| 6,394,243 B1 | * | 5/2002 | Sasse | F16H 45/02 192/113.34 |
| 2006/0191761 A1 | * | 8/2006 | Schroder | F16D 25/0638 192/3.29 |

(Continued)

FOREIGN PATENT DOCUMENTS

JP    2013117282 A    6/2013

*Primary Examiner* — Colby M Hansen
(74) *Attorney, Agent, or Firm* — United IP Counselors, LLC (57) ABSTRACT

A clutch portion is disposed between a front cover and a turbine. A piston is movable in an axial direction and turns the clutch portion into a torque transmission state. A sleeve supports an inner peripheral surface of the piston such that the piston is movable in the axial direction. An oil chamber is supplied a hydraulic oil for activating the piston to turn the clutch portion into the torque transmission state. The sleeve includes an inner peripheral side oil channel and an outer peripheral side oil channel. The inner peripheral side oil channel leads the hydraulic oil residing on an inner peripheral side of the sleeve to an outer peripheral side. The outer peripheral side oil channel leads the hydraulic oil led thereto through the inner peripheral side oil channel to the oil chamber.

9 Claims, 6 Drawing Sheets

(56) References Cited

U.S. PATENT DOCUMENTS

| | | | | |
|---|---|---|---|---|
| 2009/0283378 A1* | 11/2009 | Degler | ............... | F16D 13/648 |
| | | | | 192/3.29 |
| 2011/0120829 A1* | 5/2011 | Vanni | .................. | F16H 45/02 |
| | | | | 192/3.29 |
| 2014/0027231 A1* | 1/2014 | Tanaka | ................. | F16H 45/02 |
| | | | | 192/3.29 |

* cited by examiner

LOCK-UP DEVICE FOR TORQUE CONVERTER

CROSS-REFERENCE TO RELATED APPLICATIONS

This application claims priority to Japanese Patent Application No. 2016-055069 filed on Mar. 18, 2016, the entirety of which is hereby incorporated by reference in its entirety.

BACKGROUND

Technical Field

The present disclosure relates to a lock-up device, and particularly to a lock-up device for a torque converter, which is configured to transmit a torque from a front cover to a transmission-side member through a turbine.

Background Information

Torque converters are often equipped with a lock-up device for directly transmitting a torque from a front cover to a turbine. Such a lock-up device includes a piston, an input-side plate, a plurality of torsion springs, and an output-side plate. The piston is capable of being coupled by friction to the front cover. The input-side plate is fixed to the piston. The torsion springs are supported by the input-side plate. The output-side plate is elastically coupled through the torsion springs to the piston and the input-side plate in a rotational direction. The output-side plate is fixed to the turbine.

Additionally, as described in Japan Laid-open Patent Application Publication No. 2013-117282, there has been also proposed a type of lock-up device that a plurality of clutch plates are used to increase its clutch capacity.

In the lock-up device described in Japan Laid-open Patent Application Publication No. 2013-117282, an oil chamber for activating the piston is defined between the piston and the turbine. To define the oil chamber, a boss made in the shape of a sleeve is fixed to the inner peripheral part of the front cover, and the piston is supported by the outer peripheral surface of the boss while being movable in an axial direction. Additionally, the boss is provided with oil channels for leading hydraulic oil to the oil chamber.

In the lock-up device described in Japan Laid-open Patent Application Publication No. 2013-117282, each of the oil channels for leading the hydraulic oil to the oil chamber is made in the shape of a hole penetrating the boss from its inner peripheral side to its outer peripheral side. In this construction, the amount of hydraulic oil flowing into the oil chamber cannot be limited. Hence, the piston is activated with a great force, and shock occurs when the clutch plates are pressed in contact with each other, in other words, when a clutch-on state is made.

On the other hand, increase in size of each clutch plate is required to increase the clutch capacity of the lock-up device. Additionally, increase in outer diameter of the boss is required with increase in size of each clutch plate. In this situation, each of the oil channels (holes) provided in the boss inevitably has a quite large length with respect to the diameter of each hole. This construction makes it difficult to process the oil channels.

BRIEF SUMMARY

It is an object of the present disclosure to alleviate shock when a clutch-on state of a lock-up device is made, and in addition, to easily form oil channels for leading hydraulic oil to an oil chamber.

(1) A lock-up device for a torque converter according to the present disclosure is configured to transmit a torque from a front cover to a transmission-side member through a turbine. The lock-up device includes a clutch portion, a piston, a sleeve and an oil chamber. The clutch portion is disposed between the front cover and the turbine. The piston is disposed to be movable in an axial direction and is configured to turn the clutch portion into a torque transmission state. The sleeve supports an inner peripheral surface of the piston such that the piston is movable in the axial direction. The oil chamber is configured to be supplied a hydraulic oil for activating the piston to turn the clutch portion into the torque transmission state. Additionally, the sleeve includes an inner peripheral side oil channel and an outer peripheral side oil channel. The inner peripheral side oil channel leads the hydraulic oil residing on an inner peripheral side of the sleeve to an outer peripheral side. The outer peripheral side oil channel leads the hydraulic oil led thereto through the inner peripheral side oil channel to the oil chamber.

In the lock-up device, the hydraulic oil is supplied to the oil chamber through the inner peripheral side oil channel and the outer peripheral side oil channel of the sleeve. Accordingly, the piston is moved in the axial direction, and the clutch portion is turned into the torque transmission state.

In this construction, the inner peripheral side oil channel and the outer peripheral side oil channel are separately provided in the sleeve. Hence, it is easy to take countermeasures for the aforementioned drawback, including exertion of an orifice effect by narrowly forming the outer peripheral side oil channel compared to the inner peripheral side oil channel. Therefore, when the clutch-on state is made, shock can be easily alleviated by controlling the speed of the hydraulic oil flowing through the oil channels and so forth and by inhibiting pulsation of the flow rate of an oil pump.

Additionally, the oil channels are separately provided in the sleeve. Hence, the oil channels can be separately processed, and can be easily processed even when the sleeve has a large outer diameter.

(2) The inner peripheral side oil channel and the outer peripheral side oil channel may be provided at different angles with respect to a rotational axis of the torque converter.

The inner peripheral side oil channel and the outer peripheral side oil channel can be herein processed from different directions. Therefore, the inner peripheral side oil channel and the outer peripheral side oil channel can be easily processed.

(3) The outer peripheral side oil channel may be provided orthogonally to the rotational axis. Therefore, the hydraulic oil is easily released therefrom by rotation.

(4) The sleeve may include an oil sump provided between the inner peripheral side oil channel and the outer peripheral side oil channel.

With the oil sump herein provided, the orifice effect can be more effectively exerted at the outer peripheral side oil channel. Additionally, the oil sump makes the inner peripheral side oil channel and the outer peripheral side oil channel communicate therethrough. Hence, positional alignment is not required for holes composing the inner peripheral side oil channel and those composing the outer peripheral side oil channel. This makes it easy to process the inner peripheral side oil channel and the outer peripheral side oil channel.

(5) The outer peripheral side oil channel may have a smaller flow channel area than the inner peripheral side oil channel. Therefore, as described above, the orifice effect can be exerted, and shock can be alleviated when the clutch-on state is made.

(6) Each of the inner peripheral side oil channel and the outer peripheral side oil channel may include at least one hole. Each of the at least one hole of the outer peripheral side oil channel may have a smaller diameter than each of the at least one hole of the inner peripheral side oil channel. Therefore, similarly to the above, the orifice effect can be exerted, and shock can be alleviated when the clutch-on state is made.

(7) The lock-up device may further include an oil chamber plate. The oil chamber plate is disposed on an outer peripheral part of the sleeve so as to be opposed to the piston in the axial direction. The oil chamber plate defines the oil chamber together with the piston (8) The oil chamber plate may include a tubular part. The tubular part supports an outer peripheral surface of the piston such that the piston is movable.

(9) The lock-up device may further include seal members. One of the seal members seals between the inner peripheral surface of the piston and an outer peripheral surface of the sleeve. The other of the seal members seals between the outer peripheral surface of the piston and an inner peripheral surface of the tubular part of the oil chamber plate.

Overall, according to the present disclosure as described above, it is possible to alleviate shock when the clutch-on state of the lock-up device is made, and in addition, to easily form the oil channels for leading the hydraulic oil to the oil chamber.

BRIEF DESCRIPTION OF THE DRAWINGS

Referring now to the attached drawings which form a part of this original disclosure.

DETAILED DESCRIPTION OF EMBODIMENTS

Figure 1:
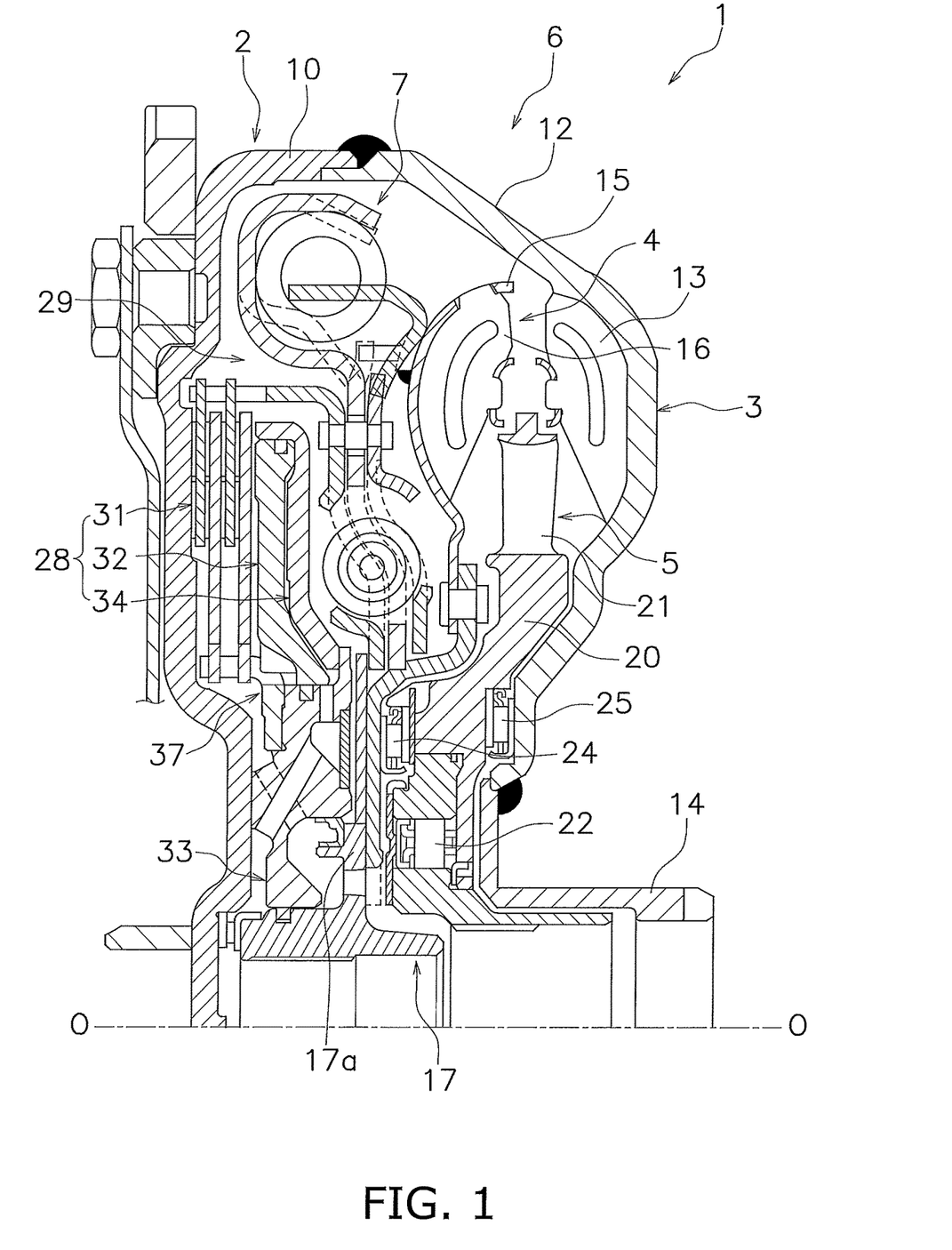
FIG. 1 is a cross-sectional view of a torque converter including a lock-up device according to a preferred embodiment of the present disclosure.

FIG. 1 is a partial cross-sectional view of a torque converter 1 including a lock-up device according to a preferred embodiment of the present disclosure. In FIG. 1, an engine (not shown in the drawing) is disposed on the left side whereas a transmission (not shown in the drawing) is disposed on the right side. It should be noted that line O-O depicted in FIG. 1 indicates a common rotational axis for the torque converter 1 and the lock-up device. It should be also noted that in the following explanation, the term "radial direction" refers to a direction separating from the rotational axis whereas the term "axial direction" refers to a direction arranged along the rotational direction.

(Entire Construction of Torque Converter 1)

The torque converter 1 is a device configured to transmit a torque from an engine-side crankshaft (not shown in the drawings) to an input shaft of the transmission. As shown in FIG. 1, the torque converter 1 is composed of a front cover 2, a torque converter body 6 and a lock-up device 7.

The front cover 2 is fixed to an input-side member. The front cover 2 is a substantially disc-shaped member, and its outer peripheral part protrudes toward the transmission as an outer peripheral tubular part 10.

The torque converter body 6 is composed of three types of bladed wheels (an impeller 3, a turbine 4 and a stator 5).

The impeller 3 is composed of an impeller shell 12, a plurality of impeller blades 13 and an impeller hub 14. The impeller shell 12 is fixed to the outer peripheral tubular part 10 of the front cover 2 by welding. The impeller blades 13 are fixed to the inside of the impeller shell 12. The impeller hub 14 has a tubular shape and is disposed on the inner peripheral side of the impeller shell 12.

The turbine 4 is disposed in opposition to the impeller 3 within a fluid chamber. The turbine 4 is composed of a turbine shell 15, a plurality of turbine blades 16 and a turbine hub 17. The turbine blades 16 are fixed to the inside of the turbine shell 15. The turbine hub 17 is fixed to the inner peripheral part of the turbine shell 15. The turbine hub 17 includes a flange 17a extending radially outside. The inner peripheral part of the turbine shell 15 is fixed to the flange 17a by welding or a plurality of rivets (not shown in the drawings). Additionally, the turbine hub 17 is provided with a spline hole in its inner peripheral part. The spline hole is engaged with the input shaft of the transmission (not shown in the drawings).

The stator 5 is configured to regulate the flow of hydraulic oil returning from the turbine 4 to the impeller 3, and is disposed between the inner peripheral part of the impeller 3 and that of the turbine 4. The stator 5 is mainly composed of a stator carrier 20 and a plurality of stator blades 21 mounted to the outer peripheral surface of the stator carrier 20. The stator carrier 20 is supported by a stationary shaft through a one-way clutch 22. It should be noted that thrust bearings 24 and 25 are disposed axially on the both sides of the stator carrier 20.

(Lock-Up Device 7)

Figure 2:
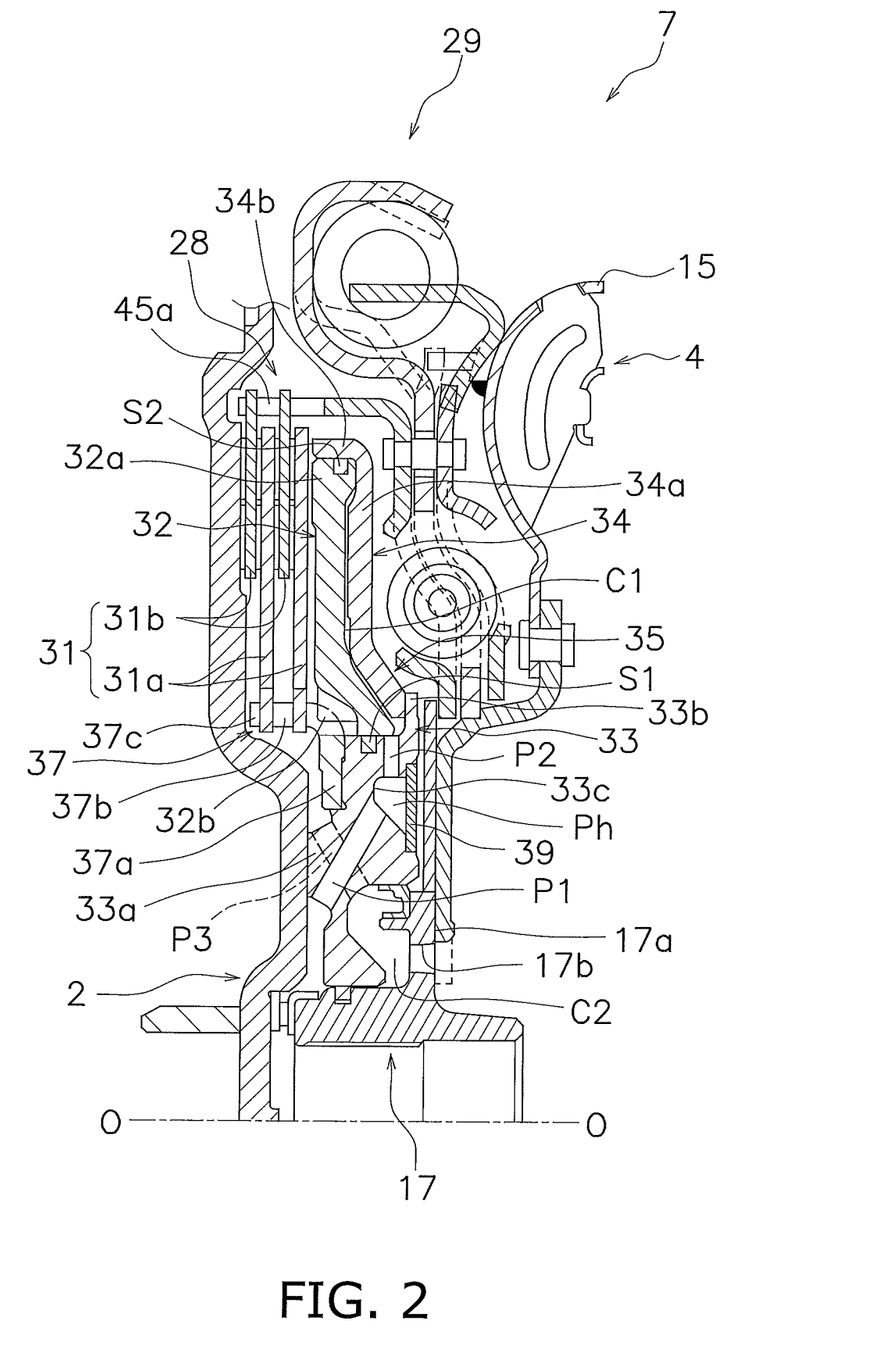
FIG. 2 is a diagram extracted from FIG. 1 and shows a part for supporting a clutch portion and a piston.

As shown in FIGS. 1 and 2, the lock-up device 7 is disposed in a space between the front cover 2 and the turbine 4. The lock-up device 7 includes a clutch unit 28 and a damper portion 29.

<Clutch Unit 28>

As shown in FIGS. 1 and 2, the clutch unit 28 is a multi-plate clutch. The clutch unit 28 includes a plurality of clutch plates 31 (clutch portion), a piston 32, and a support member 35. The support member 35 is composed of a sleeve 33 and an oil chamber plate 34.

—Clutch Plates 31—

The plural clutch plates 31 are disposed between the front cover 2 and the piston 32. The plural clutch plates 31 include two first clutch plates 31a and two second clutch plates 31b. The first clutch plates 31a have an annular shape, and likewise, the second clutch plates 31b have an annular shape. These two types of clutch plates, i.e., the first and second clutch plates 31a and 31b, are alternately disposed while being aligned in the axial direction. Each first clutch plate 31a is provided with a plurality of teeth on its inner peripheral part. Each of the first and second clutch plates 31a and 31b is provided with a friction facing fixed to one lateral surface thereof. Each of the second clutch plates 31b is provided with a plurality of teeth on its outer peripheral part.

—Piston 32—

Figure 3:
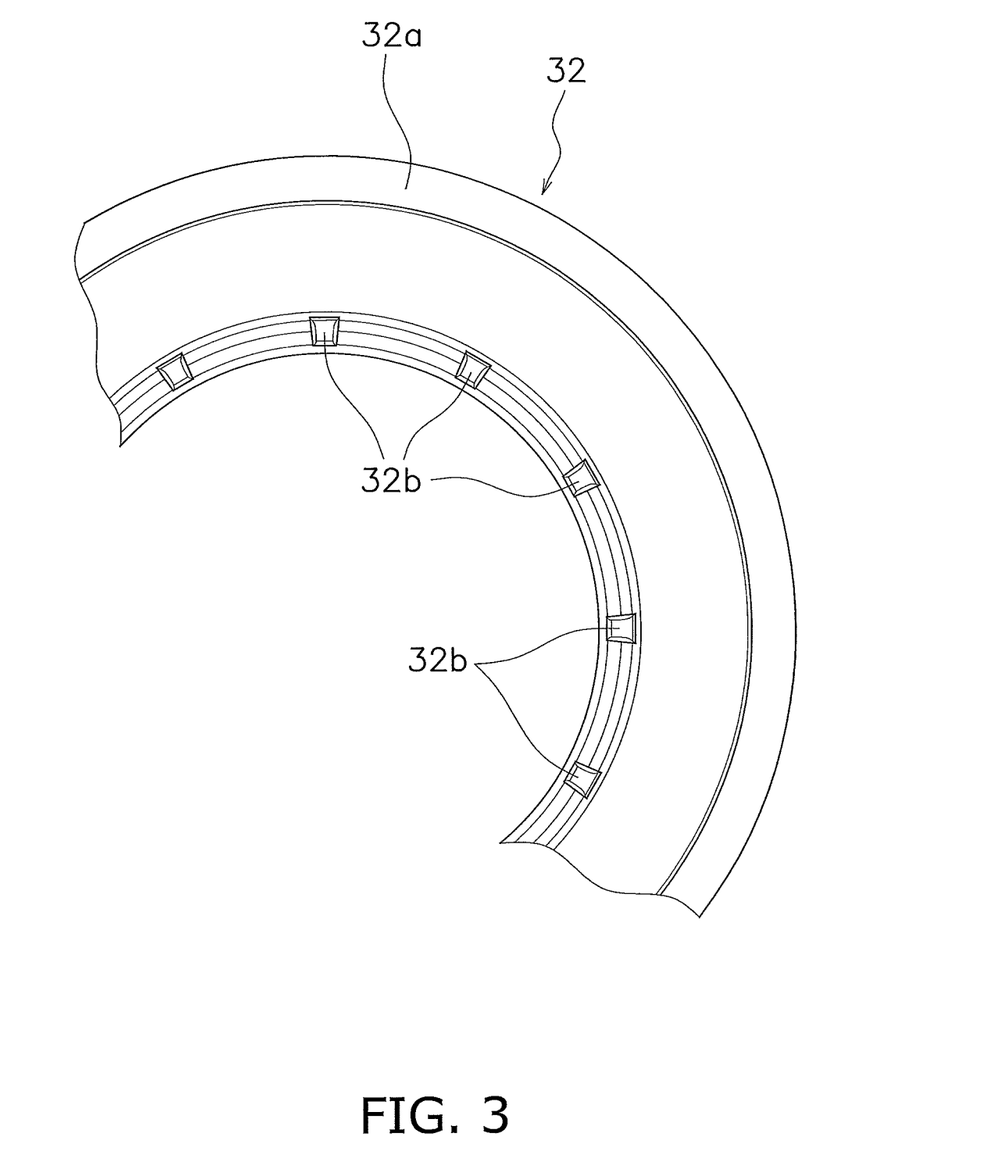
FIG. 3 is a partial front view of the piston.

The piston 32 has an annular shape and is disposed on the transmission side of the front cover 2. The piston 32 is supported by the support member 35 while being movable in the axial direction. The piston 32 includes a pressing part 32a and a plurality of engaging protrusions 32b. The pressing part 32a is a part for pressing the plural clutch plates 31 toward the front cover 2. The pressing part 32a is provided on the outer peripheral part of the piston 32 so as to be opposed to the plural clutch plates 31 in the axial direction. The engaging protrusions 32b are provided on the inner peripheral part of the piston 32, and protrude therefrom to the inner peripheral side. As shown in FIG. 3, the plural engaging protrusions 32b are provided at predetermined intervals in the circumferential direction. It should be noted that FIG. 3 is a front view of the piston 32 seen from the front cover 2 side.

—Support Member 35—

The sleeve 33 composes part of the support member 35 and includes an annular protrusion 33a. The annular protrusion 33a axially protrudes from the front cover 2-side lateral surface of the sleeve 33. Therefore, gaps are produced between the front cover 2 and the sleeve 33, and are located on the inner peripheral side and the outer peripheral side of the annular protrusion 33a, respectively. The annular protrusion 33a is fixed to one lateral surface of the front cover 2 by welding or so forth. Thus, the sleeve 33 is configured to be rotated in synchronization with the front cover 2. Additionally, the sleeve 33 is provided with a flange 33b on the turbine 4-side end of its outer peripheral part. The flange 33b has an annular shape and extends radially outward.

A drive hub 37 is fixed to the sleeve 33. The drive hub 37 supports the first clutch plates 31a. The drive hub 37 includes a hub body 37a and a tubular part 37b. The hub body 37a has a substantially annular disc shape. The tubular part 37b is formed by bending the outer peripheral part of the hub body 37a toward the front cover 2.

The hub body 37a is fixed to the front cover 2-side lateral surface of the sleeve 33. The tubular part 37b is provided with a plurality of slits 37c. The slits 37c extend in the axial direction, while being aligned at predetermined intervals in the circumferential direction. The slits 37c are opened on the front cover 2 side. The teeth, provided on the inner peripheral part of the first clutch plates 31a, are engaged with the plural slits 37c. With this construction, the first clutch plates 31a are non-rotatable relatively to the drive hub 37 (i.e., the sleeve 33) but are movable relatively thereto in the axial direction.

The oil chamber plate 34 composes part of the support member 35 and is disposed on the turbine 4 side of the piston 32. The oil chamber plate 34 includes a body 34a and a tubular part 34b. The body 34a has an annular disc shape. The tubular part 34b is provided on the outer peripheral part of the body 34a. The body 34a is fixed at its inner peripheral part to the flange 33b of the sleeve 33. The tubular part 34b is formed by bending the outer peripheral part of the body 34a toward the front cover 2. Additionally, the outer peripheral part of the piston 32 is supported by the tubular part 34b while being movable in the axial direction.

<Support Structure for Oil Chamber Plate 34>

The oil chamber plate 34 is fixed at the inner peripheral part of the body 34a to the front cover 2-side lateral surface of the flange 33b of the sleeve 33 by welding. The oil chamber plate 34 is herein a member for defining an oil chamber (a first oil chamber C1 to be described) together with the piston 32 therebetween. Therefore, when the hydraulic oil is supplied to the oil chamber, a force acts on the oil chamber plate 34 in a direction separating from the piston 32. However, the oil chamber plate 34 is fixed to the piston 32-side lateral surface of the flange 33b, i.e., the surface facing in a direction opposite to the direction that the aforementioned force acts on the oil chamber plate 34. Hence, the oil chamber 34, receiving the force generated by a hydraulic pressure, is supported by the flange 33b. Accordingly, deformation of the oil chamber plate 34 can be inhibited.

<Synchronization Mechanism>

The engaging protrusions 32b of the piston 32 are engaged with the slits 37c of the drive hub 37, respectively. With this construction, the piston 32 is configured to be rotated in synchronization with the sleeve 33 and the front cover 2 through the drive hub 37. In other words, a synchronization mechanism for rotating the piston 32 in synchronization with the support member 35 is composed of the slits 37c of the drive hub 37 and the engaging protrusions 32b of the piston 32.

It should be noted that the slits 37c and the engaging protrusions 32b of the piston 32 are engaged over the entire moving range of the piston 32. Therefore, even when the piston 32 is moved in the axial direction, the slits 37c and the engaging protrusions 32b are not disengaged from each other.

<Hydraulic Circuit>

The sleeve 33 is provided with a seal member 51 on its outer peripheral surface. Thus, the seal member 51 seals between the outer peripheral surface of the sleeve 33 and the inner peripheral surface of the piston 32. On the other hand, the piston 32 is provided with a seal member S2 on its outer peripheral surface. The seal member S2 seals between the outer peripheral surface of the piston 32 and the inner peripheral surface of the tubular part 34b of the oil chamber plate 34. With these constructions, the first oil chamber C1 is defined between the piston 32 and the oil chamber plate 34 in order to press the piston 32 toward the clutch plates 31.

The sleeve 33 is provided with a hydraulic circuit. The hydraulic oil supplied from the inner peripheral part of the turbine hub 17 is supplied to the first oil chamber C1 through the hydraulic circuit. The hydraulic circuit includes a first oil channel P1, a second oil channel P2 and an oil sump Ph.

The oil sump Ph is provided on the turbine 4-side lateral surface of the sleeve 33. More specifically, a groove 33c is provided on the turbine 4-side lateral surface of the sleeve 33. The groove 33c is an annular groove recessed toward the front cover 2. Additionally, a plate 39 having an annular shape is fixed to the sleeve 33 so as to cover the groove 33c. In other words, the oil sump Ph is defined by the groove 33c and the plate 39.

The first oil channel P1 is provided from the inner peripheral surface of the annular protrusion 33a of the sleeve 33 to the oil sump Ph. The first oil channel P1 is composed of a plurality of holes, each of which tilts to get closer to the turbine 4 from the inner peripheral side to the outer peripheral side of the sleeve 33.

The second oil channel P2 is provided whereby the oil sump Ph and the first oil chamber C1 are communicated therethrough. The second oil channel P2 is composed of a plurality of holes. The holes radially extend to be orthogonal to the rotational axis. In other words, the first oil channel P1 and the second oil channel P2 are provided at different angles with respect to the rotational axis.

It should be noted that the entire channel area of the second oil channel P2 is set to be smaller than that of the first oil channel P1. Additionally, the diameter of each of the holes composing the second oil channel P2 is smaller than that of each of the holes composing the first oil channel P1. With the constructions, an orifice effect can be exerted when the hydraulic oil flows through the first oil channel P1 and the second oil channel P2. Accordingly, the flow rate of the hydraulic oil flowing out of the second oil channel P2 can be inhibited low, and pulsation of the flow rate of an oil pump can be inhibited. Consequently, shock can be alleviated when a clutch-on state is made. Moreover, in the present preferred embodiment, the oil sump Ph is defined between the first oil channel P1 and the second oil channel P2. Hence, pulsation of the flow rate of the oil pump can be further inhibited.

On the other hand, a second oil chamber C2 is defined between the inner peripheral part of the sleeve 33 and the turbine hub 17. The hydraulic oil is supplied to the second oil chamber C2 through a hole 17b provided in the flange 17a of the turbine hub 17. Additionally, the sleeve 33 is provided with a third oil channel P3. The second oil chamber C2 and a space accommodating the clutch plates 31 are communicated through the third oil channel P3.

<Damper Portion 29>

Figure 4:
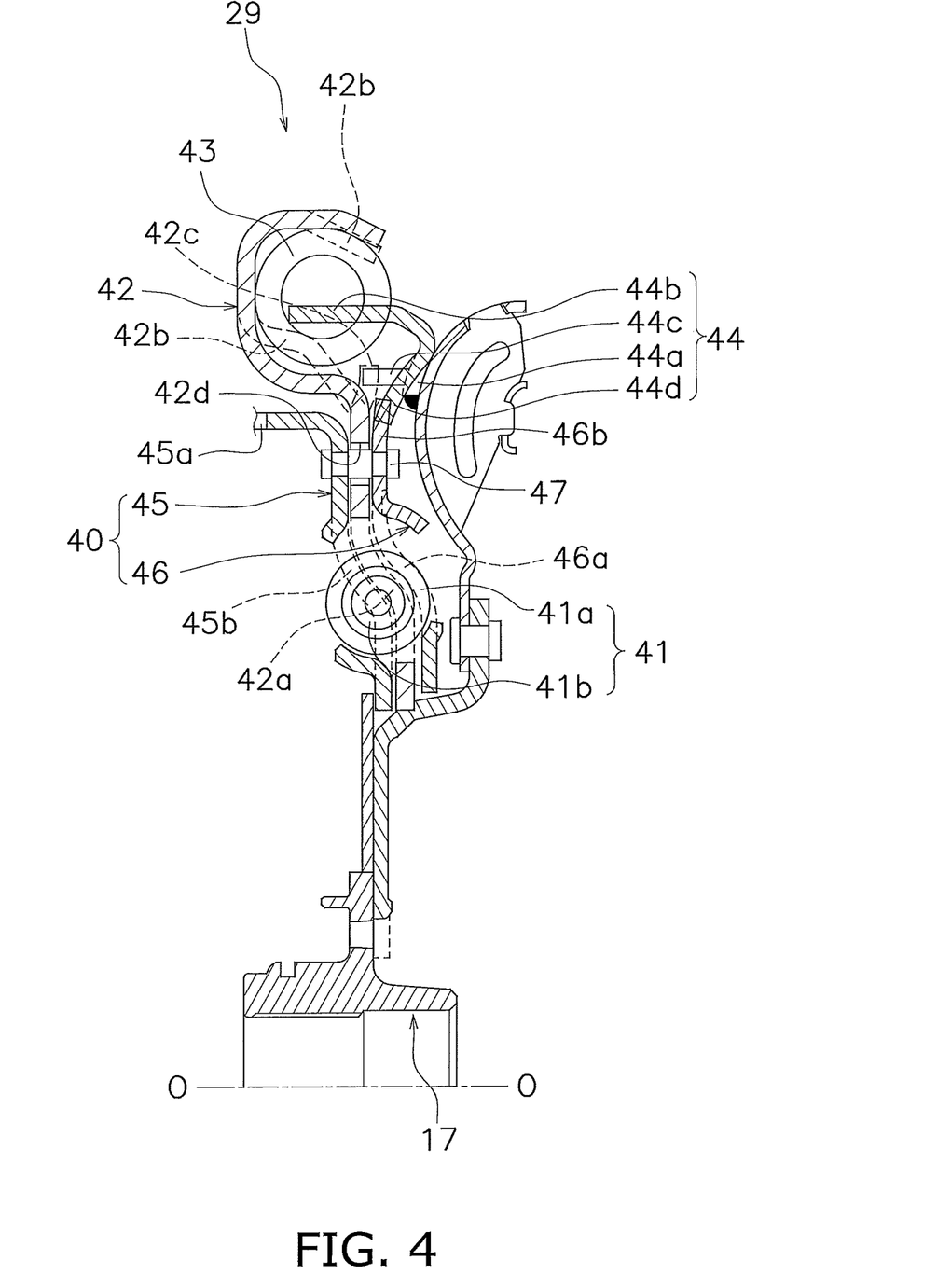
FIG. 4 is a diagram extracted from FIG. 1 and shows a damper portion.

The damper portion 29 is configured to attenuate vibration to be inputted thereto through the front cover 2. As shown in FIG. 4, the damper portion 29 includes an input-side plate 40, inner peripheral side torsion springs 41, an intermediate plate 42, outer peripheral side torsion springs 43 and a driven plate 44.

—Input-Side Plate 40—

The input-side plate 40 is mounted on the output side of the clutch unit 28. Specifically, the input-side plate 40 includes a first side plate 45 and a second side plate 46.

The first side plate 45 is the engine-side one of the plates composing the input-side plate 40. The first side plate 45 includes a first clutch engaging part 45a extending toward the front cover 2 and a plurality of first spring engaging parts 45b.

The first clutch engaging part 45a has a substantially tubular shape. The first clutch engaging part 45a is provided with a plurality of grooves. The grooves extend in the axial direction while being aligned at predetermined intervals in the circumferential direction. The teeth provided on the outer peripheral part of each second clutch plate 31b are engaged with the grooves. With this construction, the second clutch plates 31b and the first side plate 45 are non-rotatable relatively to each other but are movable relatively to each other in the axial direction.

The first spring engaging parts 45b are provided in a part extended radially inside from the turbine side end of the first clutch engaging part 45a. Specifically, the first spring engaging parts 45b are window parts disposed at predetermined intervals in the circumferential direction. Each first spring engaging part 45b is provided with cut-and-raised parts. The cut-and-raised parts are formed by cutting and raising the inner peripheral side edge and the outer peripheral side edge of each first spring engaging part 45b in the axial direction. The inner peripheral side torsion springs 41 are disposed in the first spring engaging parts 45b, respectively. Additionally, a pair of circumferentially opposed walls of each first spring engaging part 45b is engaged with the both ends of each inner peripheral side torsion spring 41.

The second side plate 46 is the transmission-side one of the plates composing the input-side plate 40. The second side plate 46 is disposed at a predetermined interval from the first side plate 45 in the axial direction. The second side plate 46 is fixed to the first side plate 45 by a plurality of stud pins 47 so as to be unitarily rotatable therewith.

The second side plate 46 includes a plurality of second spring engaging parts 46a. The second spring engaging parts 46a are window parts disposed at predetermined intervals in the circumferential direction. The second spring engaging parts 46a are disposed in axial opposition to the first spring engaging parts 45b, respectively. Each second spring engaging part 46a is provided with cut-and-raised parts. The cut-and-raised parts are formed by cutting and raising the inner peripheral side edge and the outer peripheral side edge of each second spring engaging part 46a in the axial direction. The inner peripheral side torsion springs 41 are disposed in the second spring engaging parts 46a, respectively. Additionally, a pair of circumferentially opposed walls of each second spring engaging part 46a is engaged with the both ends of each inner peripheral side torsion spring 41.

—Inner Peripheral Side Torsion Springs 41—

The plural inner peripheral side torsion springs 41 are disposed in alignment with each other in the circumferential direction.

Each of the inner peripheral side torsion springs 41 is composed of a large coil spring 41a and a small coil spring 41b. The small coil spring 41b is inserted in the interior of the large coil spring 41a. The spring length of the small coil spring 41b is shorter than that of the large coil spring 41a.

Each of the inner peripheral side torsion springs 41 is disposed in each of the first spring engaging parts 45b (window parts) of the first side plate 45, each of the second spring engaging parts 46a (window parts) of the second side plate 46, and each of third spring engaging parts 42a (window parts) of the intermediate plate 42 to be described. Each inner peripheral side torsion spring 41 is supported at both of its circumferential ends and both of its radial ends by the first, second and third spring engaging parts 45b, 46a and 42a (window parts). Additionally, each inner peripheral side torsion spring 41 is restricted from jumping out by the cut-and-raised parts of each first spring engaging part 45b (window part) and those of each second spring engaging part 46a (window part).

—Intermediate Plate 42—

The intermediate plate 42 is disposed axially between the first side plate 45 and the second side plate 46. The intermediate plate 42 is rotatable relatively to the first side plate 45, the second side plate 46 and the driven plate 44. The intermediate plate 42 is a member for causing the inner peripheral side torsion springs 41 and the outer peripheral side torsion springs 43 to act in series.

The outer peripheral part of the intermediate plate 42 has a substantially tubular shape and is opened toward the turbine 4. The tubular outer peripheral part of the intermediate plate 42 holds the outer peripheral side torsion springs 43. Additionally, fifth spring engaging parts 44b of the driven plate 44 to be described are disposed in the opening of the tubular outer peripheral part.

The intermediate plate 42 includes the plurality of third spring engaging parts 42a, a plurality of fourth spring engaging parts 42b and an elongated hole 42d.

The third spring engaging parts 42a are provided in the inner peripheral part of the intermediate plate 42, and are engaged with the inner peripheral side torsion springs 41, respectively. The third spring engaging parts 42a are window parts disposed at predetermined intervals in the circumferential direction. Each third spring engaging part 42a is disposed axially between, and in opposition to, each pair of the first spring engaging part 45b and the second spring engaging part 46a. The inner peripheral side torsion springs 41 are disposed in the third spring engaging parts 42a, respectively. Additionally, a pair of circumferentially opposed walls of each third spring engaging part 42a is engaged with the both ends of each inner peripheral side torsion spring 41.

The fourth spring engaging parts 42b are provided in the outer peripheral part of the intermediate plate 42, while being aligned at predetermined intervals in the circumferential direction. The fourth spring engaging parts 42b are engaged with the outer peripheral side torsion springs 43. Circumferentially adjacent two of the fourth spring engaging parts 42b are engaged with the both ends of each outer peripheral side torsion spring 43. When described in detail, circumferentially adjacent two of the fourth spring engaging parts 42b are engaged with the inner peripheral parts and the outer peripheral parts of the both ends of each outer peripheral side torsion spring 43.

The elongated hole 42d has a circumferentially elongated shape. The stud pins 47 are inserted through the elongated hole 42d. When described in detail, the trunk part of each stud pin 47 is inserted through the elongated hole 42d. Under the condition, the both ends of each stud pin 47 are fixed to the first side plate 45 and the second side plate 46. The intermediate plate 42 is attached to the first and second side plates 45 and 46 through the stud pins 47, while being rotatable relatively thereto.

—Outer Peripheral Side Torsion Springs 43—

The plural outer peripheral side torsion springs 43 are disposed in alignment with each other in the circumferential direction. Additionally, the outer peripheral side torsion springs 43 are disposed radially outside the clutch unit 28.

The outer peripheral side torsion springs 43 are held by the outer peripheral part of the intermediate plate 42, and are configured to act in series with the inner peripheral side torsion springs 41 through the intermediate plate 42.

Each outer peripheral side torsion spring 43 is supported at its both circumferential ends by circumferentially adjacent two of the fourth spring engaging parts 42b of the intermediate plate 42. Additionally, each outer peripheral side torsion spring 43 is restricted from jumping out to the radially outside by the outer peripheral part (tubular part) of the intermediate plate 42, while being interposed between circumferentially adjacent two of the fourth spring engaging parts 42b. Moreover, each outer peripheral side torsion spring 43 makes contact at its both circumferential ends with circumferentially adjacent two of the fifth spring engaging parts 44b of the driven plate 44.

—Driven Plate 44—

The driven plate 44 is an annular disc member and is fixed to the turbine shell 15. Additionally, the driven plate 44 is rotatable relatively to the intermediate plate 42.

The driven plate 44 includes a body 44a, the plural fifth spring engaging parts 44b, a first stopper pawl 44c and a second stopper pawl 44d.

The body 44a has a substantially annular shape and is fixed to the turbine shell 15. When described in detail, the body 44a is fixed to the turbine shell 15 by fixation means such as welding.

The plural fifth spring engaging parts 44b are provided on the outer peripheral side of the body 44a while being integrated with the body 44a. The fifth spring engaging parts 44b extend axially toward the engine from the body 44a. The fifth spring engaging parts 44b are engaged with the outer peripheral side torsion springs 43. The fifth spring engaging parts 44b are formed by bending the outer peripheral part of the driven plate 44 axially toward the engine.

The fifth spring engaging parts 44b are disposed at predetermined intervals in the circumferential direction. Each outer peripheral side torsion spring 43 is disposed between circumferentially adjacent two of the fifth spring engaging parts 44b. Circumferentially adjacent two of the fifth spring engaging parts 44b are engaged with the both ends of each outer peripheral side torsion spring 43.

<Stopper Mechanisms>

In the present preferred embodiment, stopper mechanisms are composed of part of the intermediate plate 42, part of the second side plate 46, and part of the driven plate 44. The stopper mechanisms are configured to restrict relative rotation among these plates 42, 46 and 44. The stopper mechanisms will be hereinafter explained in detail.

The intermediate plate 42 is provided with a cutout 42c in its radially intermediate part. The cutout 42c is provided radially between the third spring engaging parts 42a and the fourth spring engaging parts 42b. The cutout 42c has a circumferentially elongated shape and is opened to the outer peripheral side. On the other hand, the driven plate 44 is provided with a first stopper pawl 44c as described above. The first stopper pawl 44c is inserted into the cutout 42c.

The first stopper pawl 44c is provided on the inner peripheral part of the driven plate 44, i.e., the inner peripheral part of the body 44a. The first stopper pawl 44c is a part extending axially toward the engine from the inner peripheral part of the body 44a. When described in detail, the first stopper pawl 44c is formed by partially bending the inner peripheral part of the body 44a axially toward the engine.

With the aforementioned construction, the intermediate plate 42 is restricted from rotating relatively to the driven plate 44 by the contact of the first stopper pawl 44c with one of the circumferential end surfaces of the cutout 42c of the intermediate plate 42. In other words, one stopper mechanism is composed of the first stopper pawl 44c and the cutout 42c of the intermediate plate 42.

Additionally, the second side plate 46 is provided with a cutout 46b on its outer peripheral end. The cutout 46b is opened to the outer peripheral side. On the other hand, the driven plate 44 is provided with the second stopper pawl 44d as described above. The second stopper pawl 44d is inserted into the cutout 46b.

The second stopper pawl 44d is provided on the inner peripheral part of the driven plate 44, i.e., the inner peripheral part of the body 44a. The second stopper pawl 44d is formed by partially extending the inner peripheral part of the body 44a to the further inner peripheral side.

With the aforementioned construction, the first and second side plates 45 and 46 are restricted from rotating relatively to the driven plate 44 by the contact of the second stopper pawl 44d with one of the end surfaces of the cutout 46b of the second side plate 46. In other words, the other stopper mechanism is composed of the second stopper pawl 44d and the cutout 46b of the second side plate 46.

<Positioning Structure for Damper Portion 29>

Figure 5:
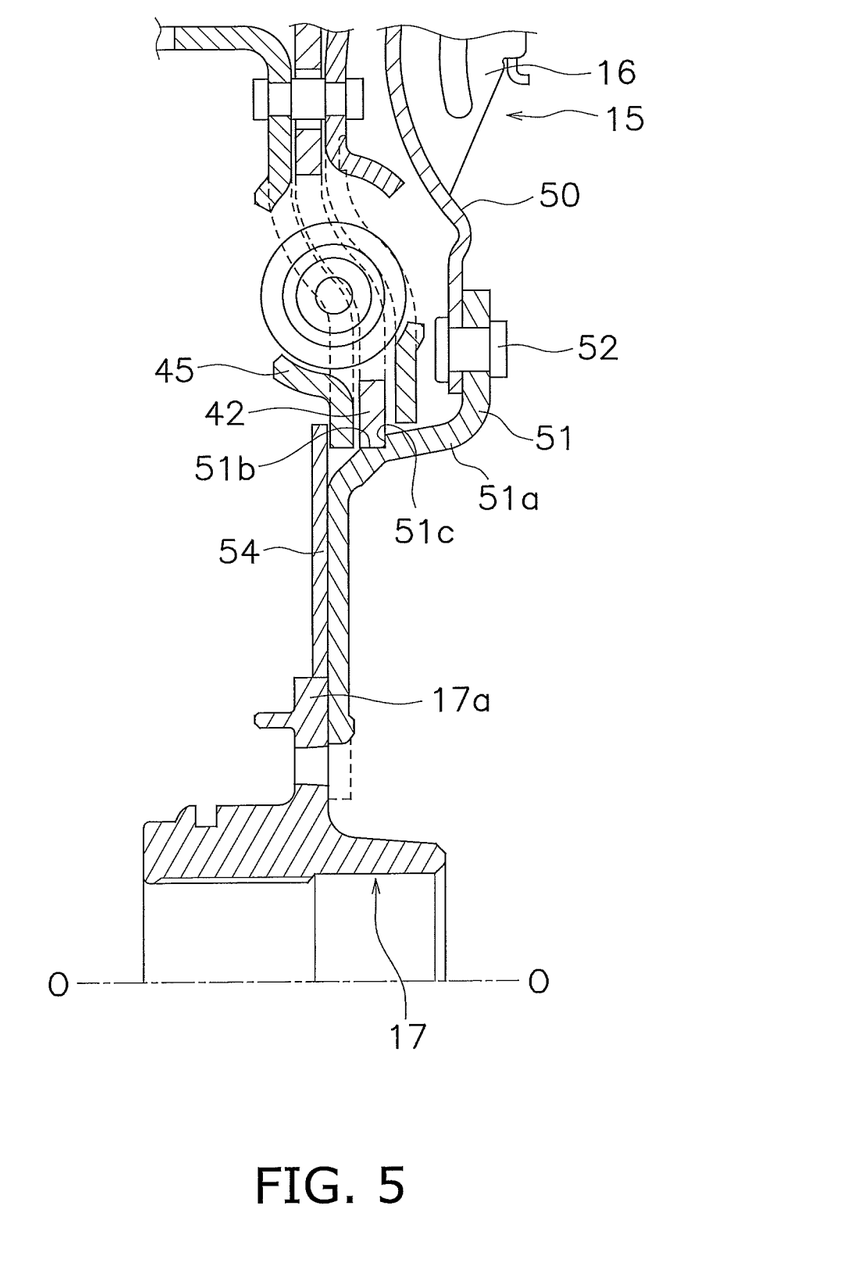
FIG. 5 is a diagram of a positioning structure of the damper portion.

A structure for positioning the damper portion 29 will be explained with reference to FIG. 5. This positioning structure is provided for positioning the damper portion 29 in the radial direction and the axial direction.

In the present preferred embodiment, the turbine shell 15 includes a turbine shell body 50 and a coupling member 51. The turbine blades 16 are disposed inside the turbine shell body 50. The coupling member 51 is coupled at its outer peripheral part to the inner peripheral part of the turbine shell body 50 by rivets 52, while being coupled at its inner peripheral part to the flange 17a of the turbine hub 17 by welding or rivets (not shown in the drawing). The coupling member 51 includes a tubular part 51a in its radially intermediate part. The tubular part 51a extends in the axial direction.

The tubular part 51a is provided with a first positioning surface 51b and a second positioning surface 51c. The first and second positioning surfaces 51b and 51c are formed by cutting or so forth. The first positioning surface 51b has an annular shape and is arranged in parallel to the rotational axis. The second positioning surface 51c has an annular shape, and extends radially outward from the turbine 4-side end of the first positioning surface 51b while being arranged orthogonally to the rotational axis.

Additionally, the inner peripheral end surface of the intermediate plate 42 of the damper portion 29 makes contact with the first positioning surface 51b. Accordingly, the entire damper portion 29 is positioned in the radial direction. On the other hand, a lateral surface of the inner peripheral end of the intermediate plate 42 makes contact with the second positioning surface 51c. Accordingly, the entire damper portion 29 is restricted from moving axially toward the turbine.

Moreover, a restriction plate 54, having an annular disc shape, is fixed to the front cover 2-side lateral surface of the inner peripheral part of the coupling member 51. The restriction plate 54 extends to the outer peripheral side than the inner peripheral end of the first side plate 45 of the damper portion 29. Additionally, the front cover 2-side lateral surface of the first side plate 45 is contactable to the outer peripheral end of the restriction plate 54. With this construction, the entire damper portion 29 is restricted from moving axially toward the front cover 2.

(Actions)

First, an action of the torque converter body 6 will be explained. During rotation of the front cover 2 and the impeller 3, the hydraulic oil flows from the impeller 3 to the turbine 4, and further flows to the impeller 3 through the stator 5. Accordingly, a torque is transmitted from the impeller 3 to the turbine 4 through the hydraulic oil. The torque transmitted to the turbine 4 is transmitted to the input shaft of the transmission through the turbine hub 17.

It should be noted that during running of the engine, the hydraulic oil constantly flows into the second oil chamber C2 through the hole 17b of the turbine hub 17 and is further supplied to the clutch plates 31 and the impeller 3 through the third oil channel P3.

When the speed ratio of the torque converter 1 increases and rotation of the input shaft reaches a predetermined velocity, the hydraulic oil is supplied to the first oil chamber C1 through the first oil channel P1, the oil sump Ph and the second oil channel P2. At this time, the hydraulic pressure in the first oil chamber C1 is higher than that of the hydraulic oil supplied to the side on which the clutch plates 31 are disposed. Accordingly, the piston 32 is moved toward the front cover 2. As a result, the pressing part 32a of the piston 32 presses the clutch plates 31 toward the front cover 2, whereby a lock-up state (clutch-on state) is made.

In the aforementioned clutch-on state, a torque is transmitted from the front cover 2 to the torque converter body 6 through the lock-up device 7. Specifically in the lock-up device 7, the torque inputted into the front cover 2 is sequentially transmitted to the clutch plates 31, the first and second side plates 45 and 46, the inner peripheral side torsion springs 41 (the large coil springs 41a and the small coil springs 41b), the intermediate plate 42, the outer peripheral side torsion springs 43, and the driven plate 44 in this order, and is then outputted to the turbine hub 17.

The lock-up device 7 turned into the clutch-on state is herein configured to transmit a torque as described above and simultaneously attenuate fluctuation in torque inputted thereto through the front cover 2. Specifically, when torsional vibration occurs in the lock-up device 7, the inner peripheral side torsion springs 41 and the outer peripheral side torsion springs 43 are configured to be compressed in series between the first and second side plates 45 and 46 and the driven plate 44. Fluctuation in torque, occurring with torsional vibration, is thus attenuated by the activation of the inner peripheral side torsion springs 41 and the outer peripheral side torsion springs 43.

It should be noted that when the lock-up state is turned off (i.e., a clutch-off state is made), the first oil chamber C1 is configured to be connected to a drain. Accordingly, the hydraulic oil in the first oil chamber C1 is discharged through the second oil channel P2, the oil sump Ph and the first oil channel P1. In this condition, the hydraulic pressure in the first oil chamber C1 becomes lower than that of the side on which the clutch plates 31 are disposed. Hence, the piston 32 is moved toward the turbine 4. As a result, the pressure applied to the clutch plates 31 from the pressing part 32a of the piston 32 is released. Accordingly, the clutch-off state is made.

(Torsional Characteristics)

Figure 6:
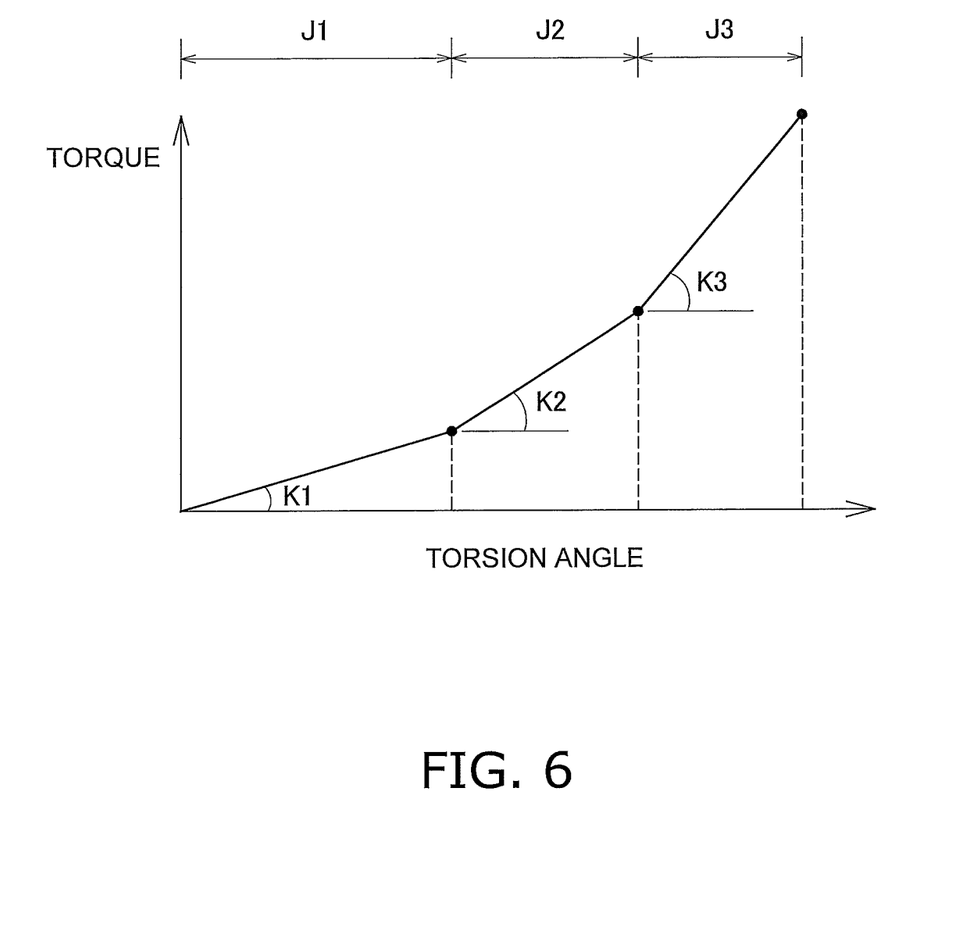
FIG. 6 is a chart showing torsional characteristics of the lock-up device.

Next, torsional characteristics will be explained with FIG. 6. In the clutch-on state of the lock-up device 7, a torque inputted through the front cover 2 is transmitted to the damper portion 29 through the clutch plates 31. At this time, when relative rotation occurs among the first and second side plates 45 and 46, the intermediate plate 42 and the driven plate 44 and a torsion angle is produced among them, the outer peripheral side torsion springs 43 and the large coil springs 41a of the inner peripheral side torsion springs 41 are compressed in series through the intermediate plate 42. Accordingly, a first torsional stiffness K1 is formed. In FIG. 6, reference sign J1 represents a range in which a torque with respect to a torsion angle is determined by the first torsional stiffness K1.

Next, with increase in torque to be transmitted, a relative rotation angle (torsion angle) increases between the intermediate plate 42 and the first and second side plates 45 and 46. When the relative rotation angle therebetween becomes a predetermined angle, the small coil springs 41b of the inner peripheral side torsion springs 41 are also compressed. In other words, in this condition, the large coil springs 41a of the inner peripheral side torsion springs 41 and the outer peripheral side torsion springs 43 are compressed in series, and simultaneously, the large coil springs 41a and the small coil springs 41b of the inner peripheral side torsion springs 41 are compressed in parallel.

A second torsional stiffness K2 is formed by the aforementioned actions. In FIG. 6, reference sign J2 represents a range in which the torque with respect to the torsion angle is determined by the second torsional stiffness K2. Subsequently, with further increase in torsion angle, the first stopper pawl 44c of the driven plate 44 makes contact with one of the end surfaces of the cutout 42c of the intermediate plate 42.

With further increase in torque to be transmitted, the relative rotation angle (torsion angle) further increases among the first and second side plates 45 and 46, the intermediate plate 42 and the driven plate 44 (in this condition, the intermediate plate 42 and the driven plate 44 are rotated in synchronization with each other). Relative rotation between the intermediate plate 42 and the driven plate 44 is thus prevented in and after the range J2. Hence, the outer peripheral side torsion springs 43 are deactivated. In other words, in and after the range J2, the large coil springs 41a and the small coil springs 41b of the inner peripheral side torsion springs 41 are compressed.

A third torsional stiffness K3 is formed by the aforementioned actions. In FIG. 6, reference sign J3 represents a range in which the torque with respect to the torsion angle is determined by the third torsional stiffness K3. Subsequently, with further increase in torsion angle, the second stopper pawl 44d of the driven plate 44 makes contact with one end surface of the cutout 46b of the second side plate 46. In this condition, the large coil springs 41a and the small coil springs 41b of the inner peripheral side torsion springs 41 are deactivated.

(Features)

In the lock-up device of the present preferred embodiment, the first oil channel P1 as the inner peripheral side oil channel and the second oil channel P2 as the outer peripheral side oil channel are separately provided in the sleeve 33. Hence, the first oil channel P1 and the second oil channel P2 can be separately processed, and can be easily processed even when the sleeve 33 has a large outer diameter. Especially, the first oil channel P1 and the second oil channel P2 can be processed from different directions. Hence, the first and second oil channels P1 and P2 can be more easily processed.

Additionally, the second oil channel P2 is designed to have a smaller flow channel area than the first oil channel P1 so as to exert the orifice effect. Hence, it is possible to inhibit the flow speed or so forth of the hydraulic oil to be supplied to the first oil chamber C1 and inhibit pulsation of the flow rate of the oil pump. Therefore, the piston 32 can be smoothly moved, and shock can be alleviated when the clutch-on state is made.

The second oil channel P2 radially extends to be orthogonal to the rotational axis. Therefore, the hydraulic oil is easily released therefrom by rotation.

The oil sump Ph is provided between the first oil channel P1 and the second oil channel P2. Hence, the orifice effect can be more effectively exerted for the hydraulic oil flowing through the first and second oil channels P1 and P2. Additionally, the oil sump Ph herein provided makes the first oil channel P1 and the second oil channel P2 communicate therethrough. Hence, positional alignment is not required for the holes composing the first oil channel P1 and those composing the second oil channel P2. This makes it easier to process the first and second oil channels P1 and P2.

Other Preferred Embodiments

The present disclosure is not limited to the aforementioned preferred embodiment, and a variety of changes or modifications can be made without departing from the scope of the present disclosure.

(a) The aforementioned preferred embodiment has employed both of the construction that the second oil channel P2 has a smaller flow channel area than the first oil channel P1 and the construction that each of the holes composing the second oil channel P2 has a smaller diameter than each of the holes composing the first oil channel P1. However, only either of the constructions may be employed.

(b) The shape of the oil sump Ph is not limited to that of the aforementioned preferred embodiment. Alternatively, the oil sump Ph may not be provided.

What is claimed is:

1. A lock-up device for a torque converter, the lock-up device configured to transmit a torque from a front cover to a transmission-side member through a turbine, the lock-up device comprising:
   a clutch portion disposed between the front cover and the turbine;
   a piston disposed to be movable in an axial direction, the piston configured to turn the clutch portion into a torque transmission state;
   a sleeve supporting an inner peripheral surface of the piston such that the piston is movable in the axial direction; and
   an oil chamber configured to be supplied a hydraulic oil for activating the piston to turn the clutch portion into the torque transmission state, wherein
   the sleeve includes an inner peripheral side oil channel and an outer peripheral side oil channel, the inner peripheral side oil channel leading the hydraulic oil residing on an inner peripheral side of the sleeve to an outer peripheral side, the outer peripheral side oil channel leading the hydraulic oil led thereto through the inner peripheral side oil channel to the oil chamber, the outer peripheral side oil channel including a hole connecting a radially inner surface of the sleeve to a radially outer surface of the sleeve.

2. The lock-up device for a torque converter according to claim 1, wherein the inner peripheral side oil channel and the outer peripheral side oil channel are provided at different angles with respect to a rotational axis of the torque converter.

3. The lock-up device for a torque converter according to claim 2, wherein the outer peripheral side oil channel is provided orthogonally to the rotational axis.

4. The lock-up device for a torque converter according to claim 1, wherein the sleeve includes an oil sump provided between the inner peripheral side oil channel and the outer peripheral side oil channel.

5. The lock-up device for a torque converter according to claim 1, wherein the outer peripheral side oil channel has a smaller flow channel area than the inner peripheral side oil channel.

6. The lock-up device for a torque converter according to claim 1, wherein each of the inner peripheral side oil channel and the outer peripheral side oil channel includes at least one hole, each of the at least one hole of the outer peripheral side oil channel has a smaller diameter than each of the at least one hole of the inner peripheral side oil channel.

7. The lock-up device for a torque converter according to claim 1, further comprising:
   an oil chamber plate disposed on an outer peripheral part of the sleeve so as to be opposed to the piston in the axial direction, the oil chamber plate defining the oil chamber together with the piston.

8. The lock-up device for a torque converter according to claim 7, wherein the oil chamber plate includes a tubular part, the tubular part supporting an outer peripheral surface of the piston such that the piston is movable.

9. The lock-up device for a torque converter according to claim 8, further comprising:
   a plurality of seal members, one of the plurality of seal members sealing between the inner peripheral surface of the piston and an outer peripheral surface of the sleeve, the other of the plurality of seal members sealing between the outer peripheral surface of the piston and an inner peripheral surface of the tubular part of the oil chamber plate.

* * * * *